United States Patent
Hoch et al.

(10) Patent No.: US 10,459,623 B2
(45) Date of Patent: Oct. 29, 2019

(54) TOUCH DETECTION IN A CAPACITIVE SENSOR SYSTEM

(71) Applicant: Microchip Technology Incorporated, Chandler, AZ (US)

(72) Inventors: Martin Hoch, Gilching (DE); Axel Heim, Munich (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 54 days.

(21) Appl. No.: 14/599,086

(22) Filed: Jan. 16, 2015

(65) Prior Publication Data
US 2015/0301735 A1 Oct. 22, 2015

Related U.S. Application Data

(60) Provisional application No. 61/981,140, filed on Apr. 17, 2014.

(51) Int. Cl.
*G06F 3/0488* (2013.01)
*G06F 3/044* (2006.01)
*G06F 3/041* (2006.01)

(52) U.S. Cl.
CPC .......... *G06F 3/04883* (2013.01); *G06F 3/044* (2013.01); *G06F 3/0418* (2013.01); *G06F 2203/04101* (2013.01); *G06F 2203/04106* (2013.01)

(58) Field of Classification Search
CPC ......... G06F 2203/04101; G06F 1/3231; G06F 1/3262; G06F 3/044; G06F 2203/04106
See application file for complete search history.

(56) References Cited

U.S. PATENT DOCUMENTS

| | | | |
|---|---|---|---|
| 8,907,929 B2 | 12/2014 | Li et al. | 345/177 |
| 9,019,209 B2 | 4/2015 | Geaghan | 345/173 |
| 9,864,465 B2 | 1/2018 | Ye et al. | |
| 10,261,612 B2 | 4/2019 | Han et al. | |
| 2004/0193413 A1 | 9/2004 | Wilson et al. | 704/243 |
| 2008/0158172 A1* | 7/2008 | Hotelling | G06F 1/3231 345/173 |
| 2011/0279397 A1 | 11/2011 | Rimon et al. | 345/173 |

(Continued)

FOREIGN PATENT DOCUMENTS

| CN | 102830837 A | 12/2012 | ............ G06F 3/041 |
|---|---|---|---|
| CN | 102955614 A | 3/2013 | ............ G06F 3/041 |

(Continued)

OTHER PUBLICATIONS

NC7SB3157 Datasheet, Mar. 2009, Fairchild Semiconductor Corporation, Rev. 1.0.4.*

(Continued)

*Primary Examiner* — Dong Hui Liang
(74) *Attorney, Agent, or Firm* — Slayden Grubert Beard PLLC (57) ABSTRACT

A system has a two-dimensional (2D) touch detection system operable to be activated and de-activated and an additional sensor operable in communication with the 2D touch detection system. The additional sensor is capable to determine whether a touch event has occurred or is about to occur and to activate the 2D touch detection system if a touch event has occurred or is about to occur.

31 Claims, 9 Drawing Sheets

(56) References Cited

U.S. PATENT DOCUMENTS

| | | | | |
|---|---|---|---|---|
| 2011/0310094 A1* | 12/2011 | Park | ............ | G06F 1/1626 345/419 |
| 2012/0013569 A1* | 1/2012 | Swedin | ............ | G02F 1/13338 345/174 |
| 2012/0044199 A1* | 2/2012 | Karpin | ............ | G06F 3/0416 345/174 |
| 2012/0050180 A1* | 3/2012 | King | ............ | G06F 3/0416 345/173 |
| 2012/0127124 A1* | 5/2012 | Zanone | ............ | G06F 1/3231 345/174 |
| 2013/0147833 A1* | 6/2013 | Aubauer | ............ | G06F 3/0416 345/619 |
| 2013/0229382 A1* | 9/2013 | Huang | ............ | G06F 3/044 345/174 |
| 2013/0257761 A1* | 10/2013 | Karlsson | ............ | G06F 3/0488 345/173 |
| 2013/0285972 A1* | 10/2013 | Elias | ............ | G06F 3/044 345/174 |
| 2013/0314144 A1 | 11/2013 | Chang et al. | ............ | 327/361 |
| 2013/0314365 A1* | 11/2013 | Woolley | ............ | G06F 3/044 345/174 |
| 2016/0246401 A1* | 8/2016 | Han | ............ | G06F 1/3231 |

FOREIGN PATENT DOCUMENTS

| | | | | |
|---|---|---|---|---|
| CN | 103578079 A | 2/2014 | ............ | G06T 5/00 |
| JP | 63276085 A | 11/1988 | ............ | G03G 15/00 |
| JP | 2008544352 A | 12/2008 | ............ | G06F 3/041 |
| JP | 2013536493 A | 9/2013 | ............ | G01S 15/06 |
| JP | 2014164755 A | 9/2014 | ............ | G06F 3/01 |
| WO | 2006/115946 A2 | 11/2006 | ............ | G06F 3/041 |
| WO | 2012/161716 A1 | 11/2012 | ............ | G01F 1/00 |
| WO | 2013/138282 A1 | 9/2013 | ............ | G06F 3/041 |

OTHER PUBLICATIONS

Ma, Yadi et al., "Web3D Technologies and Motion Estimation in Education," Education Technology and Training, IEEE, ISBN: 978-0-7695-3563-0, pp. 69-72 (4 pages total), Dec. 21, 2008.

"MGC3130: Single-Zone 3D Gesture Controller Data Sheet," Microchip Technology Incorporated, URL: http://ww1.microchip.com/downloads/en/DeviceDoc/41667A.pdf, 40 pages, Dec. 11, 2012.

International Search Report and Written Opinion, Application No. PCT/US2015/025926, 18 pages, dated Oct. 13, 2015.

Chinese Office Action, Application No. 201580012105.1, 24 pages, dated Feb. 3, 2019.

Taiwan Rejection Decision, Application No. 104112461, 8 pages, dated Mar. 18, 2019.

Japanese Office Action, Application No. 2016557072, 6 pages, dated Apr. 15, 2019.

European Office Action, Application No. 15719371.5, 8 pages, dated Apr. 25, 2019.

Taiwan Office Action, Application No. 104112461, 28 pages, dated Oct. 29, 2018.

* cited by examiner

TOUCH DETECTION IN A CAPACITIVE SENSOR SYSTEM

CROSS-REFERENCE TO RELATED APPLICATIONS

This application claims the benefit of U.S. Provisional Application No. 61/981,140 filed on Apr. 17, 2014, which is incorporated herein in its entirety.

TECHNICAL FIELD

The present disclosure relates to touch detection in a capacitive sensor system, in particular to touch detection for event based multiplexing of a mid-range capacitive sensor system with a touch controller.

BACKGROUND

To perform touch detection for an input device, various technologies are available, in particular capacitive and resistive systems are used to detect a touch on a surface such as a display or trackpad. Other systems have been developed that allow for the detection of three-dimensional, non-touching gestures performed in a defined area.

SUMMARY

There is a need for an improved combination of touch and non-touch detection in electronic devices.

According to an embodiment, a system comprises a two-dimensional (2D) touch detection system operable to be activated and de-activated and an additional sensor operable in communication with the 2D touch detection system, wherein the additional sensor is capable to determine whether a touch event has occurred or is about to occur and to activate the 2D touch detection system if a touch event has occurred or is about to occur.

According to a further embodiment, the additional sensor can be a three-dimensional (3D) gesture detection system. According to a further embodiment, for determination of a touch event, the 3D gesture detection system may use a stochastic filter for noise suppression. According to a further embodiment, the stochastic filter can be an Unscented Kalman filter. According to a further embodiment, the stochastic filter may suppress sinusoidal noise. According to a further embodiment, the 3D gesture detection system may comprise a plurality of receiving electrodes configured to determine a gesture and a touch detection electrode. According to a further embodiment, the 3D gesture detection system may comprise a plurality of receiving electrodes configured to determine a gesture and shares at least one electrode from the touch detection system as a touch detection electrode. According to a further embodiment, the system may further comprise a multiplexer switch configured to share the at least one electrode between the 3D gesture detection system and the 2D touch detection system. According to a further embodiment, the 3D gesture detection system may comprise a plurality of receiving electrodes configured to determine a gesture and a multiplexer configured to share at least one electrode from the touch detection system to operate as a transmission electrode for the 3D gesture detection system. According to a further embodiment, the touch detection electrode may cover an area used by the 2D touch detection system. According to a further embodiment, a difference signal of subsequent samples from the touch detection electrode can be generated and evaluated over time. According to a further embodiment, the difference signal can be fed to an Unscented Kalman Filter. According to a further embodiment, an output signal of the Unscented Kalman Filter can be subtracted from the difference signal and fed to a threshold comparison unit which is configured to output a touch event signal. According to a further embodiment, the system may determine whether a touch occurred by evaluating whether a characteristic bent in the difference signal is present near the crossing of the zero-line of the difference signal. According to a further embodiment, the 2D touch detection system can be a capacitive touch detection system. According to a further embodiment, the capacitive touch detection system may comprise a projected capacitive touch controller.

According to another embodiment, a method for operating an input device may comprise the steps of: providing a two-dimensional (2D) touch detection system operable to be activated and de-activated; providing another sensor system operable to be in communication with the 2D touch detection system; activating the other sensor system and deactivating the 2D touch detection system; determining by the other sensor system whether a touch event has occurred or is about to occur; and activating the 2D touch detection system if a touch event has occurred or is about to occur.

According to a further embodiment of the method, the other sensor system can be a three-dimensional (3D) gesture detection system. According to a further embodiment of the method, for determination of a touch event, the 3D gesture detection system may use a stochastic filter for noise suppression. According to a further embodiment of the method, the stochastic filter can be an Unscented Kalman filter. According to a further embodiment of the method, the stochastic filter may suppress sinusoidal noise. According to a further embodiment of the method, the 3D gesture detection system may comprise a plurality of receiving electrodes configured to determine a gesture and a touch detection electrode. According to a further embodiment of the method, the 3D gesture detection system may comprise a plurality of receiving electrodes configured to determine a gesture and the method comprises the step of sharing at least one electrode from the touch detection system as a touch detection electrode. According to a further embodiment of the method, sharing can be performed by controlling a multiplexer switch configured to share the at least one electrode between the 3D gesture detection system and the 2D touch detection system. According to a further embodiment of the method, the 3D gesture detection system may comprise a plurality of receiving electrodes configured to determine a gesture and the method comprises the step of sharing at least one electrode from the touch detection system to operate as a transmission electrode for the 3D gesture detection system. According to a further embodiment of the method, the touch detection electrode may cover an area used by the 2D touch detection system. According to a further embodiment of the method, a difference signal of subsequent samples from the touch detection electrode can be generated and evaluated over time. According to a further embodiment of the method, the method may further comprise filtering the difference signal by an Unscented Kalman Filter. According to a further embodiment of the method, the method may further comprise subtracting the filtered signal from the difference signal and feeding the subtracted signal to a threshold comparison unit which outputs a touch event signal. According to a further embodiment of the method, the method may further comprise determining whether a touch occurred by evaluating whether a characteristic bent in the difference signal is present near the crossing of the zero-line of the difference signal. According to a further embodiment of the method, the 2D touch detection system can be a capacitive touch detection system. According to a further embodiment of the method, the capacitive touch detection system may comprise a projected capacitive touch controller.

DETAILED DESCRIPTION

According to various embodiments, a touch detection system and non-touch detection system can be combined in electronic devices to form a complex input system. Touch controllers are generally used as stand-alone input devices and integrated, for example, in various electronic devices. However, according to various embodiments, three-dimensional (3D) sensing systems may be combined with such touch sensing system or they can be modified to provide for a touch detection function. A 3D gesture detection system can be configured to work with a quasi-static alternating electric field, for example, using a 100-200 kHz square-wave signal fed to a transmitter electrode to build up such a field. Multiple detector electrodes are then used to determine attenuation caused by an object entering the field. An evaluation circuit, such as for example integrated circuit MGC3130 also known as GestIC® manufactured by Applicant, can be used to determine a 3D position. The MGC3130 is a single-zone 3D tracking and gesture controller device and described, for example, in the "Single-Zone 3D Tracking and Gesture Controller Data Sheet" available from Microchip Technology Inc. which is hereby incorporated by reference. Such a detection device may apply, for example, trilateration with distance estimates derived from received signals from various electrodes to calculate the actual three-dimensional coordinates. However, other sensor systems may be combined with a touch sensing system as will be appreciated by a person skilled in the art. Furthermore, other 3D gesture detection system may be used in combination with a touch sensing system according to various embodiments.

Touch detection systems are generally capacitive or resistive measurement systems that determine a change in capacitance or resistance caused by, for example, a finger touching a respective touch surface, such as, for example, a screen or track-pad.

3D tracking and gesture detection devices or other sensor systems and touch controllers can be configured to collaborate for providing, for example, 3D gesture tracking and precise, high-resolution 2D touch information. However, both systems, the touch controller and the other sensor system, are generally not operated simultaneously for they would interfere with each other.

Therefore, according to various embodiments, a touch detection algorithm in the other sensor system, such as for example the GestIC® device, shall activate the touch controller on a touch event or an upcoming touch event detected by the respective other sensor system.

The activation has to take place with very low latency, so that the touch controller will not miss a quick touch. A noise source which harms the other sensor signal processing (incl. touch detection) is, for example, a 50/60 Hz power grid noise. Conventionally, it is combated by applying low-pass filtering, which, however, introduces some latency that has to be avoided.

According to one embodiment, the new algorithm, which for example can be applied to a GestIC® device, employs a stochastic filter for noise suppression instead of conventional low-pass filter to achieve low latency touch detection. Such a stochastic filter can be, for example, a stochastic filter that suppresses sinusoidal noise. In particular, such a stochastic filter can be an Unscented Kalman Filter.

Figure 1A:
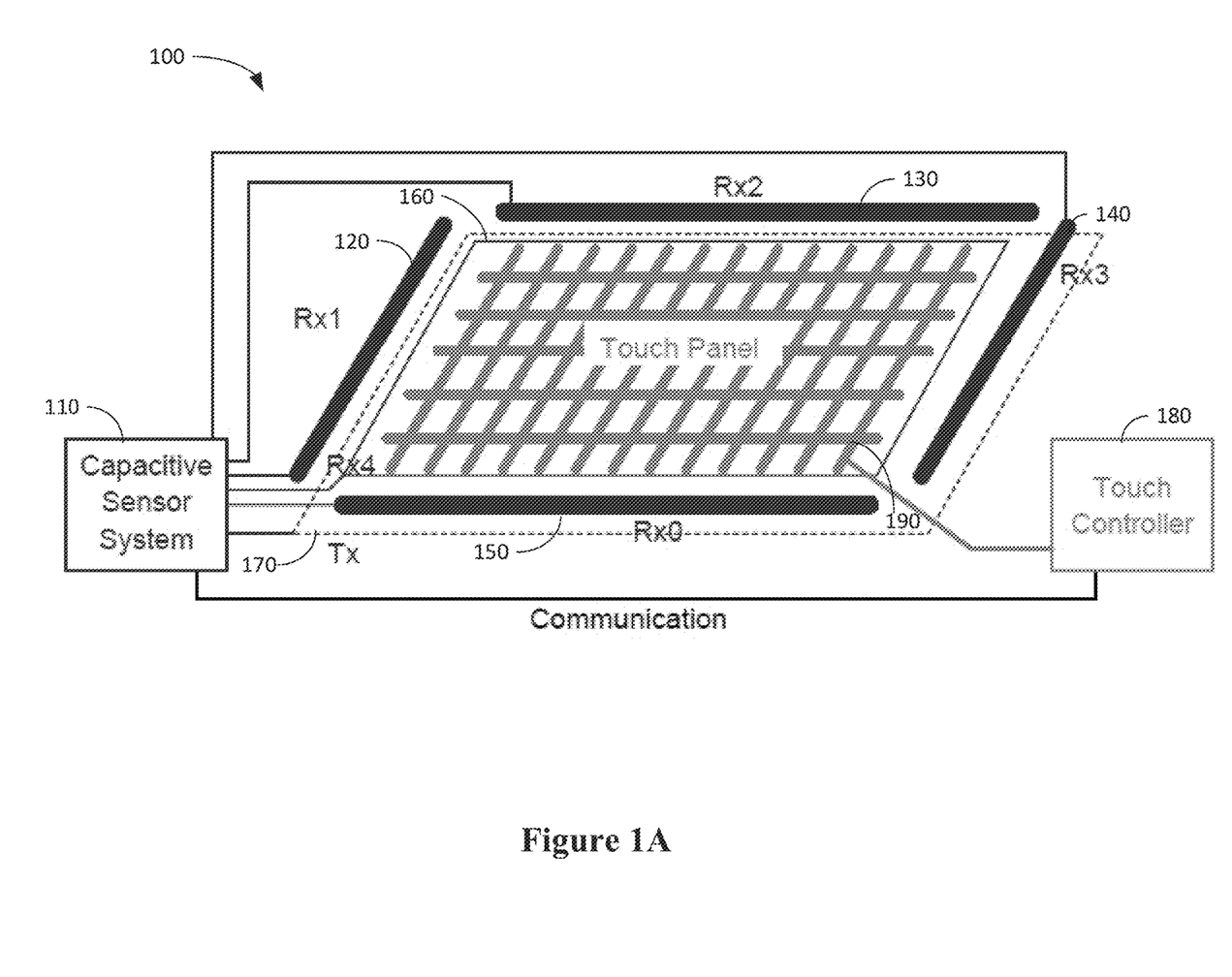
FIGS. 1A and 1B show block diagrams of combined 2D/3D touch/gesture detection systems.
Figure 1B:
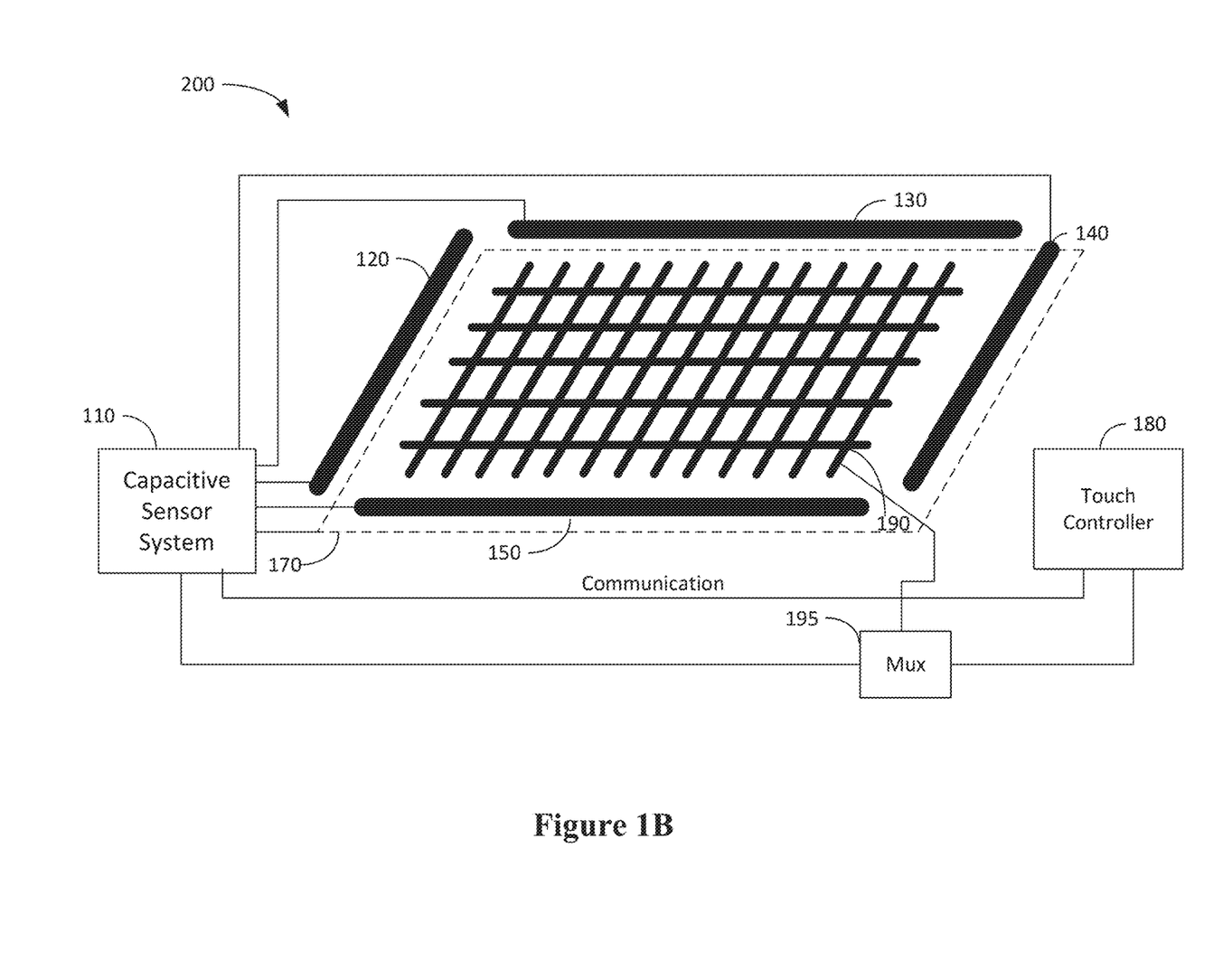

FIGS. 1A and 1B show input systems 100, 200 comprising a human machine interface that consists of a midrange Capacitive Sensor System (CSS) 110 for 3D gesture recognition and a touch controller (TC) 180 for precise, high-resolution 2D touch information. The 2D touch controller 180 can be, for example, a MTCH6301 projected capacitive touch (PCAP) controller manufactured by the Assignee of this application. A detailed description is available in the data sheet "MTCH6301" available from Microchip Technology Inc. and is hereby incorporated by reference. Other capacitive or resistive touch controllers may be used according to other embodiments.

In the shown embodiment of FIG. 1A, the CSS microcontroller 110 is connected to one transmit electrode (Tx) 170 and five receive electrodes (Rx0 . . . 4) 120, 130, 140, 150 and 160. The touch controller (TC) 180 drives/senses a touch panel 190. Alternatively, according to other embodiments, as shown for example in FIG. 1B, the CSS microcontroller 110 uses the touch panel 190 or one or more of its electrodes instead of a separate touch sensor electrode 160. A multiplexer switch 195 can then be used to switch between the CSS controller 110 and touch controller 180 as indicated by the connection lines coupling the multiplexer switch 195 with the touch panel electrode(s) 190 and either the touch controller 180 or the CSS microcontroller 110. In another embodiment, the touch panel 160 or one or more of its electrodes can be used as an additional transmit electrode of CSS while it is active.

Both devices 110 and 180 cannot operate simultaneously since their respective receive signals would be interfered by the transmit signal of the other device. However, simultaneous operation is not required because the user will either be performing 3D gestures above the touch panel or touching the touch panel 190.

While the user is not touching the touch panel, the CSS 110 is active, i.e. its transmit (TX) signal is turned on, and the TC 180 is off, i.e. its TX signal is turned off. As soon as the user is touching the touch panel 190, the TX signal of CSS 110 is switched off and that of TC 180 is activated. On release of the touch, the CSS 110 becomes active again and the TC 180 goes off. In order to realize this scheme, the CSS 110 needs a touch detection algorithm that, in the exemplary setup of FIG. 1, will run on the signal of electrode RX4, which covers the touch panel area. The four edge electrodes (Rx0 . . . 3) 120, 130, 140, 150 are used for gesture recognition.

Figure 2:
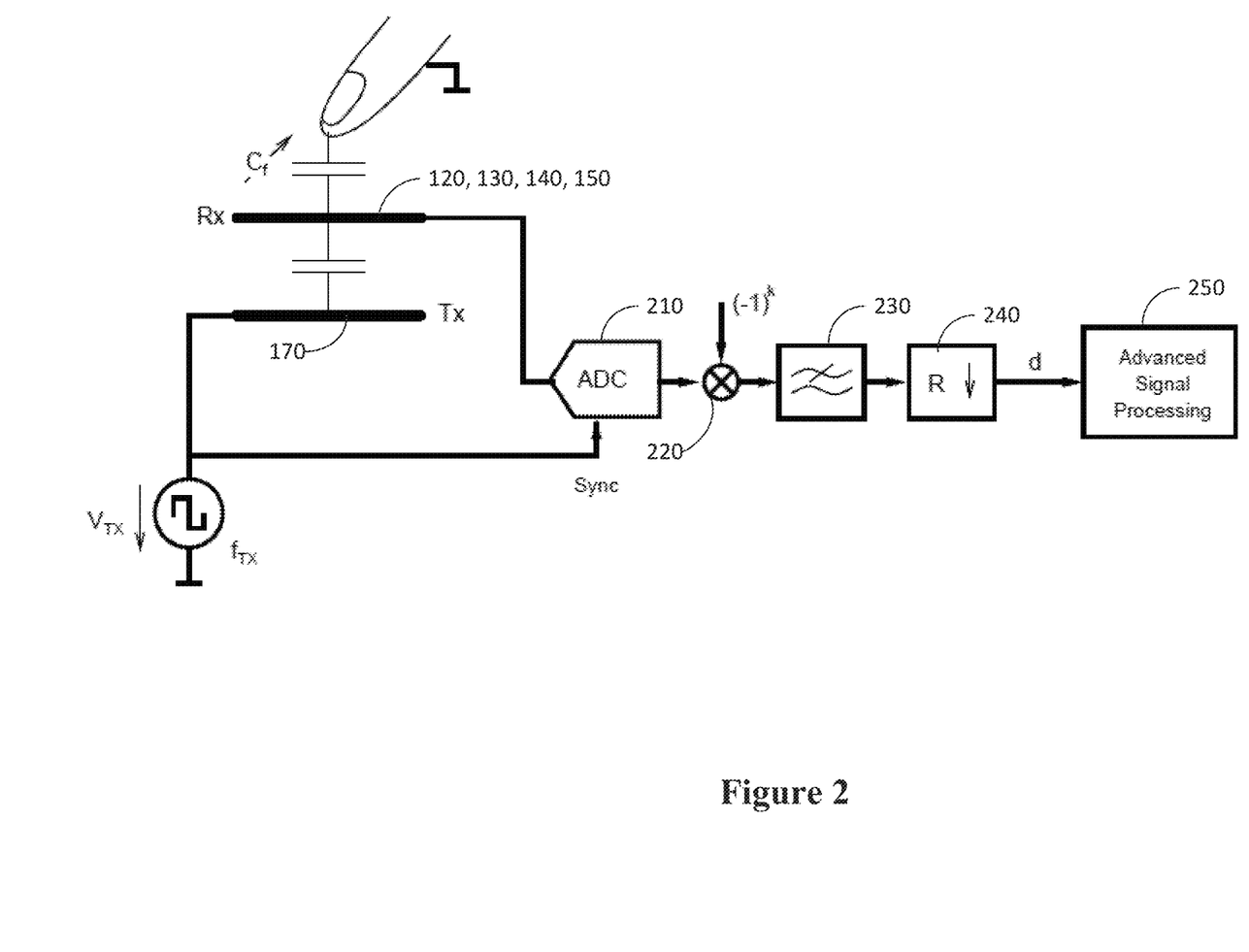
FIG. 2 shows the 3D system in more detail.

FIG. 2 depicts the principle of CSS's signal acquisition. The Tx electrode 170 is driven by a rectangular pulse train of frequency $f_{TX}$ (e.g. 100-200 kHz). Depending on the user's interaction, the capacitance $C_f$ between an Rx electrode 120, 130, 140, 150 and the user's finger changes. The voltage on $C_f$ is measured by CSS's ADC 210, and its digital output signal is demodulated by demodulator 220 and down-sampled by down-sampler 230, 240 to obtain signal d at, e.g., 200 Hz sample rate. This signal is input to Advanced Signal Processing (ASP) 250 which includes gesture recognition and touch detection.

Figure 3:
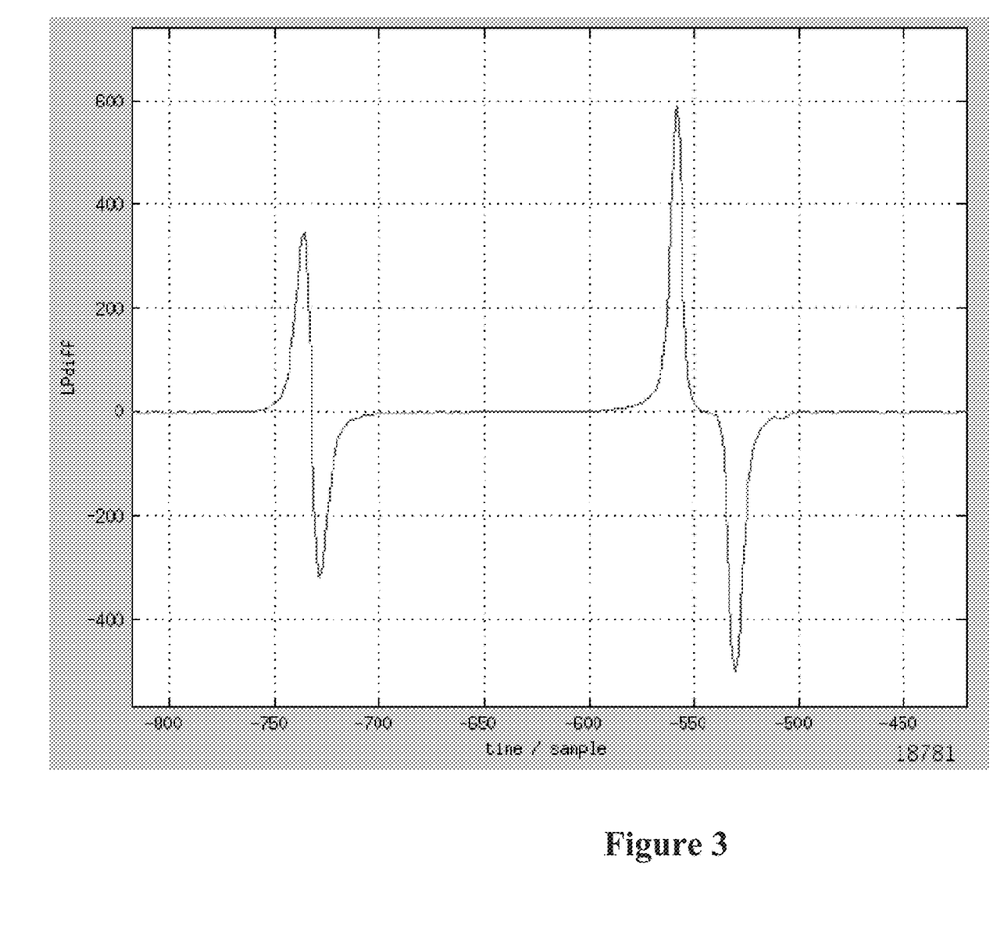
FIGS. 3-6, and 8 show various timing diagrams of received signals and their first derivative with respect to time.

The first step in ASP 250 is low-pass filtering in order to suppress noise from, for example, the 50/60 Hz power grid, yielding signal LPd[k]. FIG. 3 shows the difference signal LPdiff[k]=LPd[k]−LPd[k−1] for a finger approach towards a sensor electrode without (left) and with a touch (right), respectively. In both cases the difference signal is greater than zero during the time of approach, and during the time of removal it is smaller than zero. The significant difference is that in case of a touch there is a characteristic bent in the signal near the crossing of the zero-line which is caused by the sudden deceleration of the finger upon its physical touch of the sensor electrode (or its cover). Therefore, in order to distinguish the signal resulting from a touch event from other movements like for example flick gestures, the signal is checked for this bent.

Figure 4:
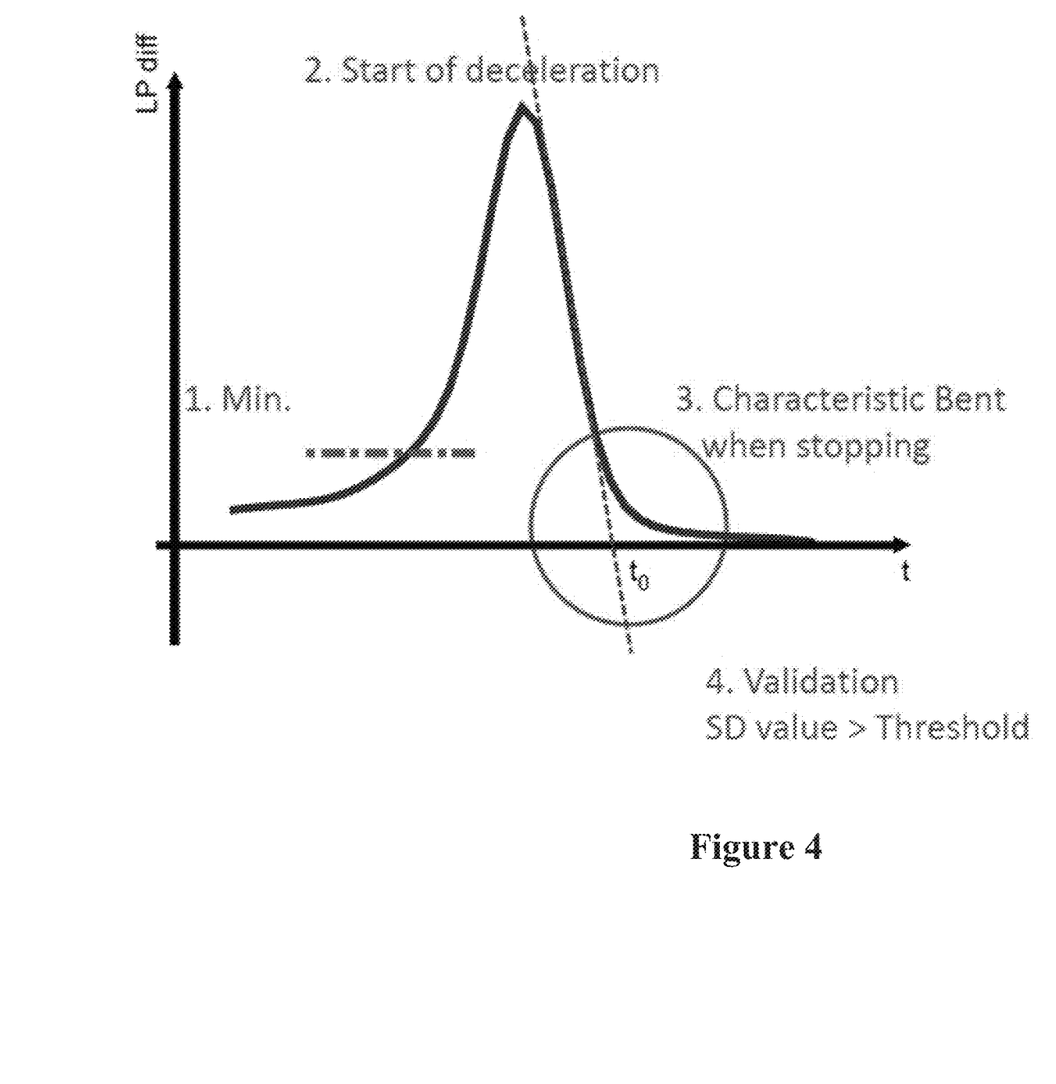

This is visualized in FIG. 4. The signal LPdiff is first checked for crossing of a positive threshold (1.) corresponding to a minimum speed of the finger in direction towards the sensor electrode. After LPdiff starts decreasing again (2.), a line is fitted onto LPdiff's negative slope, crossing the zero-line at time $t_0$. This time instance corresponds to zero-crossing of a signal that is observed for finger movement without touching. Hence, if LPdiff is still positive at $t_0$, the user's interaction is considered to be a touch (3.). The touch state is validated by comparing the offset-compensated LPd signal (signal deviation, SD) to a threshold (the closer the finger to the device, the larger the SD signal).

According to other embodiments, this touch detection algorithm can be used for a stand-alone CSS, too. Then, not only the touch event is evaluated, but additionally the touch state can be tracked on the SD value: the touch state is released as soon as the SD signal drops below a certain threshold again.

However, that additional low-pass filter in ASP 250 introduces some delay. With a typical delay of 50 ms, a quick touch of 40 ms would not be recognized by the TC 180 for the hand-over would take place too late. Consequently, a further touch detection has to work on signal d in order to feature low-latency hand-over to the TC 180.

Figure 5:
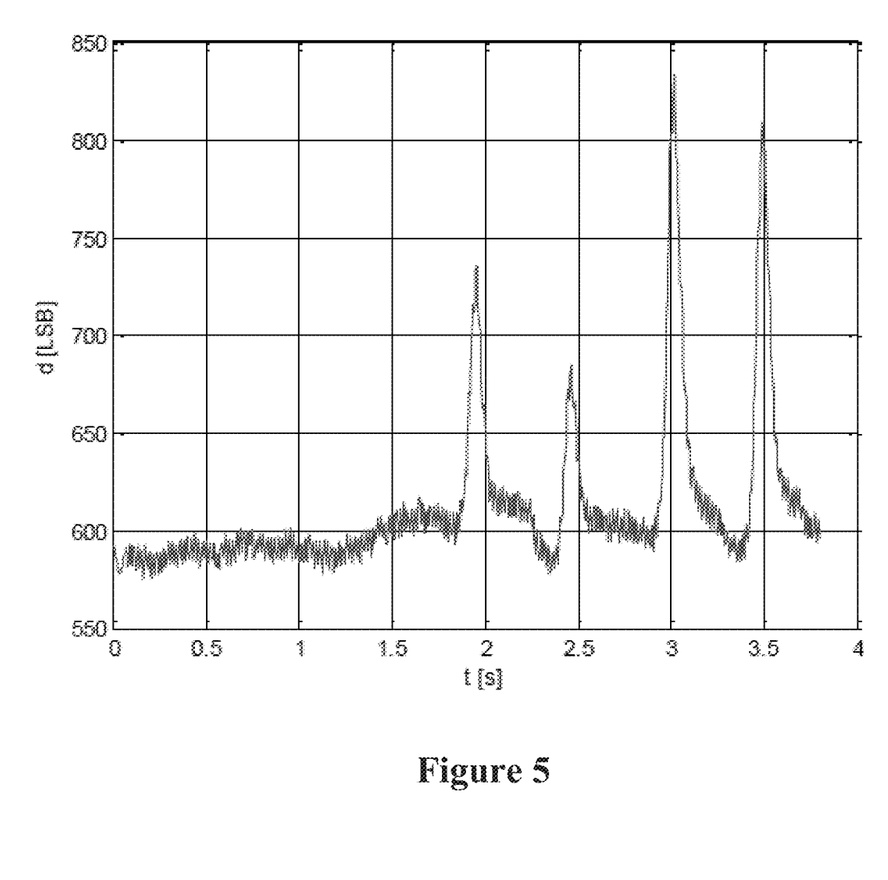

FIG. 5 is a plot of an exemplary noisy signal d, which includes four touches. A touch cannot be identified by the absolute value as there is no reliable absolute reference. But a steep signal increase may serve as a feature.

Figure 6:
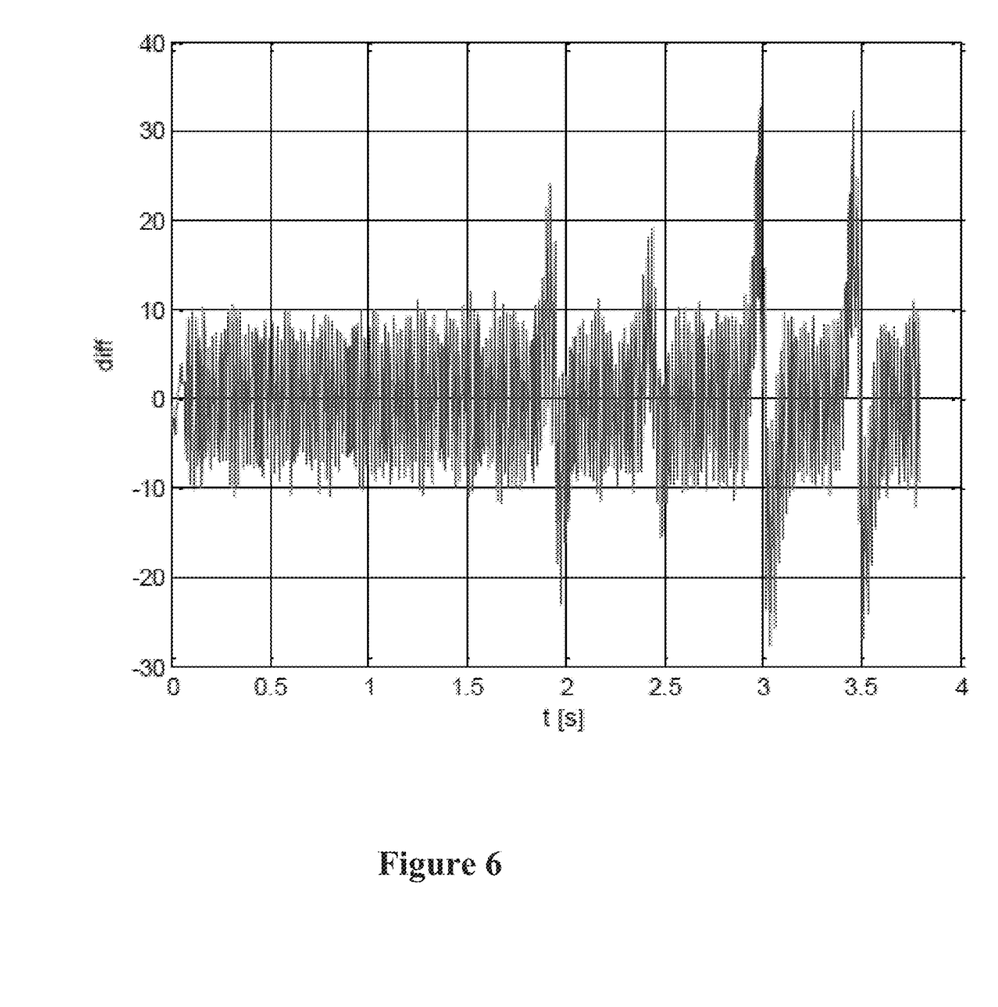

FIG. 6 contains the difference signal of d (diff), i.e. diff[k]=d[k]−d[k−1]. The touch events do not appear very clearly due to the 50 Hz noise, which might be even stronger in other environments and/or systems. In order to get rid of this sinusoidal noise, an Unscented Kalman Filter (UKF) is used to track and subtract it. The model the UKF is based on is presented in FIG. 7. The system state x comprises of amplitude, frequency and phase ([U; f; Φ]) of the power grid sinusoid. For complexity reason, states [U; f] or [U; Φ] may be chosen, too. The system state x is assumed to change at every time instance k according to $x_k = x_{k-1} + q_{k-1}$, where q denotes some process noise. From the system state, a measurement value y is calculated by $y_k = U_k \sin(2\pi f_k + \Phi_k) + r_k$, where r denotes some measurement noise.

Figure 7:
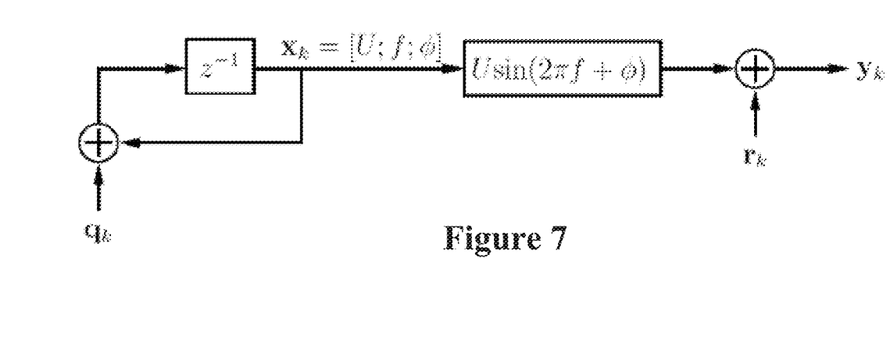
FIG. 7 shows a block diagram of an Unscented Kalman filter.

The concept of Kalman filtering is to calculate a predicted system state x' (and measurement value y') from a known measurement value y with lowest error. Core of Kalman filtering is the Kalman gain K which is needed to correct the predicted state depending on the true measurement y: $x_k = x' - K(y_k - y')$. K depends on statistical properties of x', y', q and r.

The original Kalman filter is derived for linear systems, for non-linear systems several derivatives are known such as the Extended Kalman Filter, the Particle Filter, and the Unscented Kalman Filter.

The key point of Unscented Kalman filtering is to derive the above mentioned statistical properties of x' and y' by means of so-called sigma points. This implies complex computations including a matrix square root, but avoids linearization of the sine function and results in precise estimation of the sinusoid.

Figure 8:
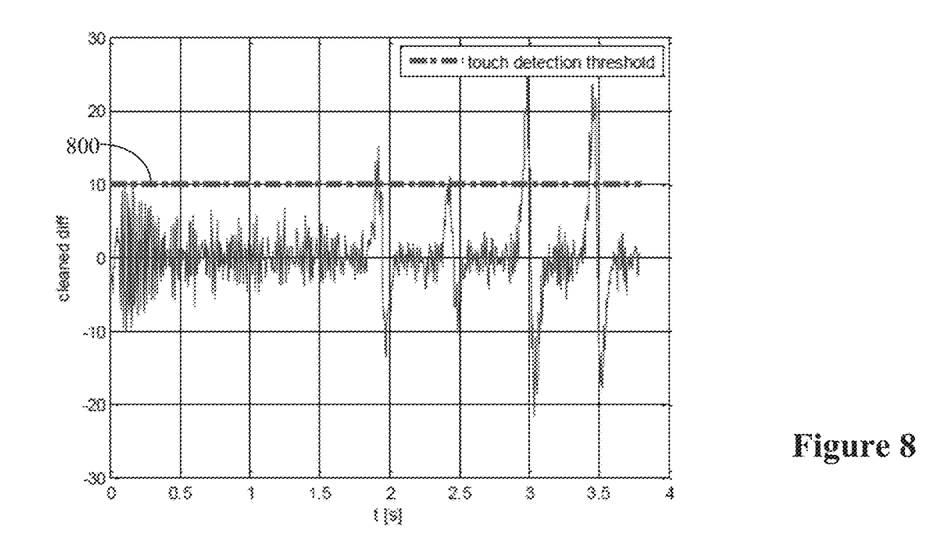

Having estimated the parameters of the power grid sinusoid, it can be subtracted from the diff signal shown in FIG. 6, thus yielding a cleaned diff signal, which is plotted in FIG. 8. Now, the touch events are unveiled from the noise. They can be detected easily and without false alarms by comparing the cleaned diff signal to a threshold 800, which has a value of 10 in this example.

Figure 9:
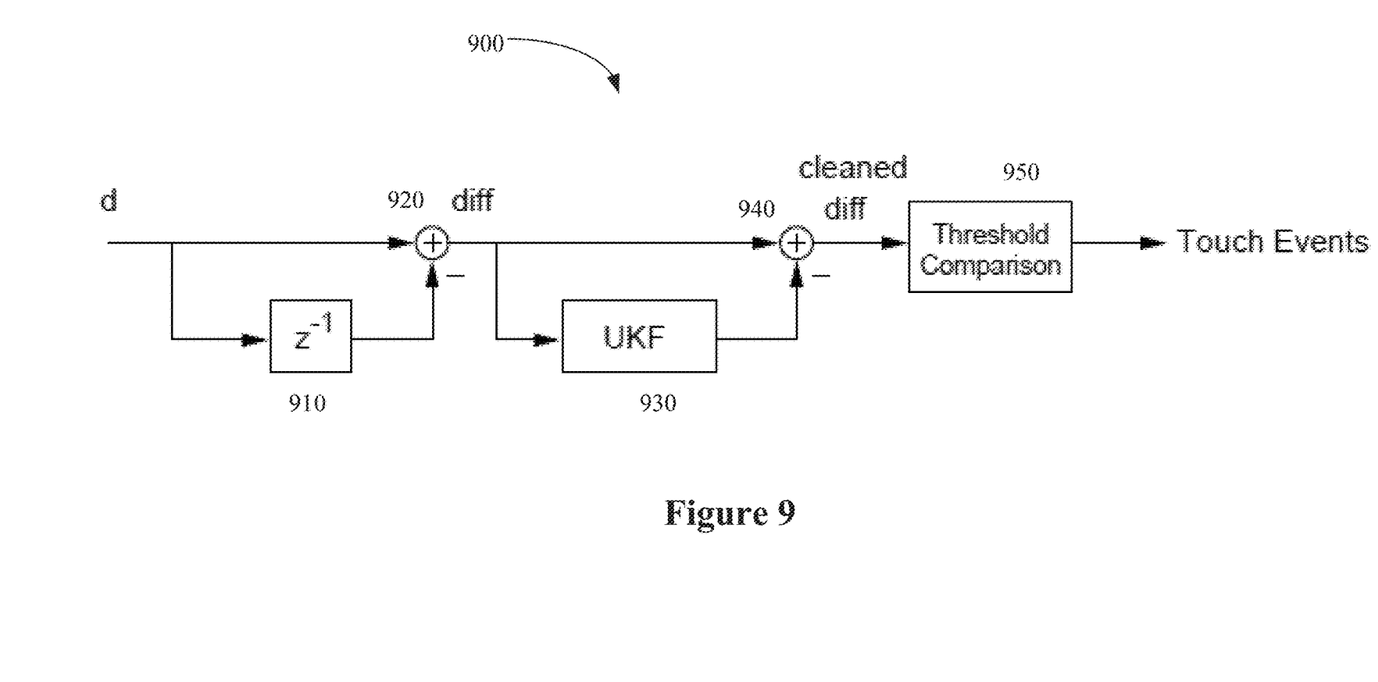
FIG. 9 shows a block diagram of the low-latency touch detection algorithm.

FIG. 9 summarizes the low-latency touch detection algorithm. Starting with signal d, its difference signal is calculated by storage element 910 and summing point 920 and fed into the Unscented Kalman Filter 930. The filter 930 estimates the 50/60 Hz component in the differential signal. The estimated sinusoid is then subtracted from the diff signal at summing point 940. Finally, the so cleaned diff signal is input to a threshold comparison 950, which outputs touch events. On these touch events, the CSS 110 is switched off and the TC 180 becomes active.

In summary, according to various embodiments, the concept of an external sensor activating the touch controller is provided. Furthermore, a touch detection algorithms for a midrange capacitive sensor system is provided which allows for a) exploiting the characteristic signal shape when the finger stops on the sensor's surface and b) suppressing sinusoidal noise by prediction, e.g. a UKF, thus avoiding delays of conventional filters.

What is claimed is:

1. A system comprising:
   a two-dimensional (2D) touch detection system comprising a plurality of capacitive touch sensors coupled with a 2D touch detection controller and being operable to be activated and de-activated;
   an additional three-dimensional (3D) gesture detection system comprising a 3D gesture detection controller and additional capacitive sensors arranged around the plurality of capacitive touch sensors and further comprising a touch detection electrode covering a touch sensor area of the 2D touch detection system being further configured to detect a touch on a touch sensor area of the 2D touch detection system, wherein the 3D gesture detection controller is communicatively coupled with the 2D touch detection controller, and the 3D gesture detection system being operable to be activated and de-activated;
   wherein the 3D gesture detection system is configured to determine a gesture performed by an object in a 3D sensing space defined by said additional capacitive sensors and touch events with said touch detection electrode and to activate the 2D touch detection system and de-activate the 3D gesture detection system if a touch event has detected by the 3D gesture detection system.

2. The system according to claim 1, wherein a difference signal of subsequent samples from the touch detection electrode is generated and evaluated over time.

3. The system according to claim 2, wherein the difference signal is fed to an Unscented Kalman Filter.

4. The system according to claim 3, wherein an output signal of the Unscented Kalman Filter is subtracted from the difference signal and fed to a threshold comparison unit which is configured to output a touch event signal.

5. The system according to claim 2, wherein the system determines whether a touch occurred by evaluating whether a characteristic bent in a course of a negative slope of the difference signal is present.

6. The system according to claim 5, wherein the system is further configured to evaluate the negative slope of the difference signal to determine a time t0 of a zero crossing of a line projected from a portion of the difference signal having said negative slope and wherein the system is configured to determine a touch when a value of the difference signal at time t0 is positive.

7. The system according to claim 1, wherein for determination of a touch event, the 3D gesture detection system uses a stochastic filter for noise suppression.

8. The system according to claim 7, wherein the stochastic filter is an Unscented Kalman filter.

9. The system according to claim 7, wherein the stochastic filter suppresses sinusoidal noise.

10. The system according to claim 1, wherein the 3D gesture detection system comprises a plurality of receiving electrodes configured to determine a gesture and shares at least one electrode from the touch detection system as a touch detection electrode.

11. The system according to claim 10, further comprising a multiplexer switch configured to share the at least one electrode between the 3D gesture detection system and the 2D touch detection system.

12. The system according to claim 1, wherein the 3D gesture detection system comprises four receiving electrodes forming a frame around said touch detection electrode and is configured to determine a gesture.

13. The system according to claim 1, wherein the 3D gesture detection system comprises a plurality of receiving electrodes configured to determine a gesture and a multiplexer configured to share at least one electrode from the touch detection system to operate as a transmission electrode for the 3D gesture detection system.

14. The system according to claim 1, wherein the 3D gesture detection system comprises a transmission electrode arranged below said additional capacitive sensors.

15. The system according to claim 1, wherein the capacitive touch detection system comprises a projected capacitive touch controller.

16. A method for operating an input device, comprising:
providing a two-dimensional (2D) touch detection system comprising a plurality of capacitive touch sensors coupled with a 2D touch detection controller and being operable to be activated and de-activated;
providing an additional three-dimensional (3D) gesture detection system comprising a 3D gesture detection controller and additional capacitive sensors arranged around the plurality of capacitive touch sensors and further comprising a touch detection electrode covering a touch sensor area of the 2D touch detection system, further being configured to detect a touch on a touch sensor area of the 2D touch detection system, and the 3D gesture detection system being operable to be activated and de-activated;
coupling the 3D gesture detection controller communicatively with the 2D touch detection controller;
activating the 3D gesture detection controller and de-activating the 2D touch detection controller by the 3D gesture detection controller;
determining by the 3D gesture detection system gestures performed by an object in a 3D sensing space defined by said additional capacitive sensors and detecting through said touch detection electrode whether a touch event has occurred; and
activating the 2D touch detection system and de-activating the 3D gesture detection system if the touch event has occurred.

17. The method according to claim 16, wherein a difference signal of subsequent samples from the touch detection electrode is generated and evaluated over time.

18. The method according to claim 17, comprising filtering the difference signal by an Unscented Kalman Filter.

19. The method according to claim 18, comprising subtracting the filtered signal from the difference signal and feeding the subtracted signal to a threshold comparison unit which outputs a touch event signal.

20. The method according to claim 17, comprising determining whether a touch occurred by evaluating whether a characteristic bent in a course of a negative slope of the difference signal is present.

21. The method according to claim 20, wherein the negative slope of the difference signal is evaluated to define a time t0 of a zero crossing of a line projected from a portion of the difference signal having said negative slope and wherein a touch is determined when a value of the difference signal at time t0 is positive.

22. The method according to claim 16, wherein for determination of a touch event, the 3D gesture detection system uses a stochastic filter for noise suppression.

23. The method according to claim 22, wherein the stochastic filter is an Unscented Kalman filter.

24. The method according to claim 22, wherein the stochastic filter suppresses sinusoidal noise.

25. The method according to claim 16, wherein the 3D gesture detection system comprises a plurality of receiving electrodes configured to determine a gesture and the method comprises the step of sharing at least one electrode from the touch detection system as a touch detection electrode.

26. The method according to claim 25, wherein sharing is performed by controlling a multiplexer switch configured to share the at least one electrode between the 3D gesture detection system and the 2D touch detection system.

27. The method according to claim 16, wherein the 3D gesture detection system comprises four receiving electrodes forming a frame around said touch detection electrode and is configured to determine a gesture.

28. The method according to claim 16, wherein the 3D gesture detection system comprises a plurality of receiving electrodes configured to determine a gesture and the method comprises the step of sharing at least one electrode from the touch detection system to operate as a transmission electrode for the 3D gesture detection system.

29. The method according to claim 16, wherein the 3D gesture detection system comprises a transmission electrode arranged below said additional capacitive sensors.

30. The method according to claim 16, wherein the capacitive touch detection system comprises a projected capacitive touch controller.

31. A system comprising:
a two-dimensional (2D) touch detection system comprising a plurality of capacitive touch sensors coupled with a 2D touch detection controller and being operable to be activated and de-activated;

an additional three-dimensional (3D) gesture detection system comprising a 3D gesture detection controller and additional capacitive sensors arranged around the plurality of capacitive touch sensors and further comprising a touch detection electrode covering a touch sensor area of the 2D touch detection system, wherein the 3D gesture detection controller is communicatively coupled with the 2D touch detection controller, and the 3D gesture detection system being operable to be activated and de-activated;

wherein the 3D gesture detection system is configured to determine a gesture performed by an object in a 3D sensing space defined by said additional capacitive sensors and touch events with said touch detection electrode, to activate the 2D touch detection system and de-activate the 3D gesture detection system if a touch event has detected by the 3D gesture detection system.

* * * * *